US006075336A

United States Patent [19]

Sugai et al.

[11] Patent Number: 6,075,336

[45] Date of Patent: Jun. 13, 2000

[54] DRIVE MECHANISM FOR STEPPING MOTOR IN PRINTER

[75] Inventors: Makoto Sugai, Saaitama; Yoshiro Kato, Tokyo; Yukihisa Kato, Higashimurayama, all of Japan

[73] Assignee: Citizen Watch Co., Ltd., Tokyo, Japan

[21] Appl. No.: 09/043,604

[22] PCT Filed: Jul. 28, 1997

[86] PCT No.: PCT/JP97/02603

§ 371 Date: May 15, 1998

§ 102(e) Date: May 15, 1998

[87] PCT Pub. No.: WO98/04416

PCT Pub. Date: May 2, 1998

[30] Foreign Application Priority Data

Jul. 26, 1996 [JP] Japan .................................... 8-214068

[51] Int. Cl.[7] ....................................................... H02P 8/00

[52] U.S. Cl. .......................... 318/696; 318/685; 318/280; 318/282; 318/286

[58] Field of Search .................................... 318/696, 685, 318/280, 282, 286; 395/111; 400/216.2

[56] References Cited

U.S. PATENT DOCUMENTS 4,652,153 3/1987 Kotsuzmumi et al. .
4,983,057 1/1991 Akiyama et al. .................... 400/216.2
5,214,750 5/1993 Minowa et al. ........................ 395/111
5,327,206 7/1994 Ueda et al. ............................ 355/313

FOREIGN PATENT DOCUMENTS 360728 3/1990 European Pat. Off. .
1231412 12/1966 Germany .
2305877 8/1973 Germany .
3530383 3/1987 Germany .
0367022 5/1989 Germany .
4020728 1/1991 Germany .
9408463 9/1994 Germany .
295 14 043 U 1/1995 Germany .
295 00 803 U 3/1995 Germany .
4400069 4/1995 Germany .
57-165282 10/1982 Japan .
58-219079 12/1983 Japan .
61-024476 2/1986 Japan .
63-21169 1/1988 Japan .
63-185667 8/1988 Japan .
2-097298 4/1990 Japan .
3-140276 6/1991 Japan .
3-248875 11/1991 Japan .
4-261398 9/1992 Japan .
4-355177 12/1992 Japan .
5-169763 7/1993 Japan .
5-221080 8/1993 Japan .
7-023595 1/1995 Japan .
08282058 10/1996 Japan .
8-322293 12/1996 Japan .

*Primary Examiner*—Karen Masih
*Attorney, Agent, or Firm*—Smith, Gambrell & Russell, LLP

[57] ABSTRACT

A printer includes a drive pulse controller which continues to output drive pulses for driving a stepping motor (M) in a forward direction after a movable member (20) has come up against a stopper (34), and thereafter stops output of the drive pulses after step out of the motor (M). The printer also includes a setting device for setting a stop phase which the stepping motor (M) takes when it starts moving in a reverse direction.

12 Claims, 13 Drawing Sheets

DRIVE MECHANISM FOR STEPPING MOTOR IN PRINTER

BACKGROUND OF THE INVENTION

1. Field of the Invention

This invention concerns a drive mechanism for stepping motors in printers, and more particularly to a drive mechanism for a stepping motor that moves a carriage shaft to which a print head is attached up and down relative to a platen and that adjusts the gap (head gap) between the print head and the paper.

2. Description of the Related Art

Many printers have been proposed (as in the Japanese patent application disclosed H7-87217 [1995], for example) which are configured so that the printer carriage is moved toward or away from the platen by a stepping motor, so that the head gap is variable, and can be adjusted, according to the thickness of the paper, head gap being the gap between the print head carried on the carriage and the paper positioned on the platen.

The printer proposed in the patent application H7-87217 is a so-called flat head printer comprising a platen positioned horizontally, the upper surface of which is flat, and a print head positioned above the platen so that it can move freely back and forth along the platen. This printer is configured such that the head gap is variably adjusted according to the thickness of the paper by using a stepping motor to move the carriage up and down relative to the printer, and causing the print head carried on the carriage to move closer to or farther away from the platen.

The head gap is made so that it can handle a paper thickness, for example, of from 0.05 mm to 2 mm. In order to maintain good print quality, the distance between the paper and the head is said to be to a precision of ±30 μm, with the amount of head gap variation being 10 μm for each step of the stepping motor. A standard position for the print head relative to the platen is established. During manufacture, the printer is assembled so that the standard position is within the desired tolerance of ±30 μm.

The stepping motor itself has no position detecting means, however, so that, in order to implement precise positioning, a position detecting means has to be provided externally.

Conventionally, when a stepping motor is used to move a carriage and thus to determine the standard position of a print head relative to the platen, position detecting means are provided such that part of the carriage turns a mechanical switch or optical switch fixed to the frame on and off.

SUMMARY OF THE INVENTION

An object of the present invention is to provide a stepping motor drive mechanism in a printer wherewith, without providing position detecting means externally, the carriage can be moved by the stepping motor so as to determine the standard position of the print head relative to the platen.

In order to achieve the object stated above, the stepping motor drive mechanism for printers that is according to the present invention comprises: a multi-phase stepping motor that turns as each phase is excited in turn by drive pulses; a stepping motor drive circuit that outputs the drive pulses; a movable member that is driven by the turning of the stepping motor; a stopper that restricts the movement of the movable member when it comes into contact with the movable member; drive pulse control means that cause the stepping motor to become out of step by continuing to output drive pulses even when the movable member has come up against the stopper and that then stop the output of the drive pulses; and excitation phase setting means that set excitation phases when the stepping motor starts to be driven in the direction in which the movable member moves away from the stopper after the stepping motor has become out of step.

Preferably, a stepping motor drive mechanism for printers according to the present invention also comprises display means for displaying on a screen the phase set by the excitation phase setting means.

More preferably, the stepping motor is a drive source for moving the printer carriage in a direction to make it approach toward or recede from the platen.

With the stepping motor drive mechanism for printers according to the present invention, the stepping motor is stopped, after the stepping motor is driven forward, causing the movable member to come up against the stopper, and putting the stepping motor in an out-of-step condition. Then, the movable member is driven in the direction opposite to the direction in which the movable member and the stopper came into contact, so that it is possible to set stable stop phases for the drive pulses for driving the stepping motor in reverse, without causing a response mismatch, that is to say, it is possible to set an excitation phase which the stepping motor takes when it stops moving in the forward direction. It is therefore possible to stop the movable member in a standard position separated from the stopper, without providing position detecting means externally, to move the carriage by the stepping motor, and thus to realize the establishment of a standard print head position relative to the platen.

DESCRIPTION OF THE PREFERRED EMBODIMENTS

Figure 1:
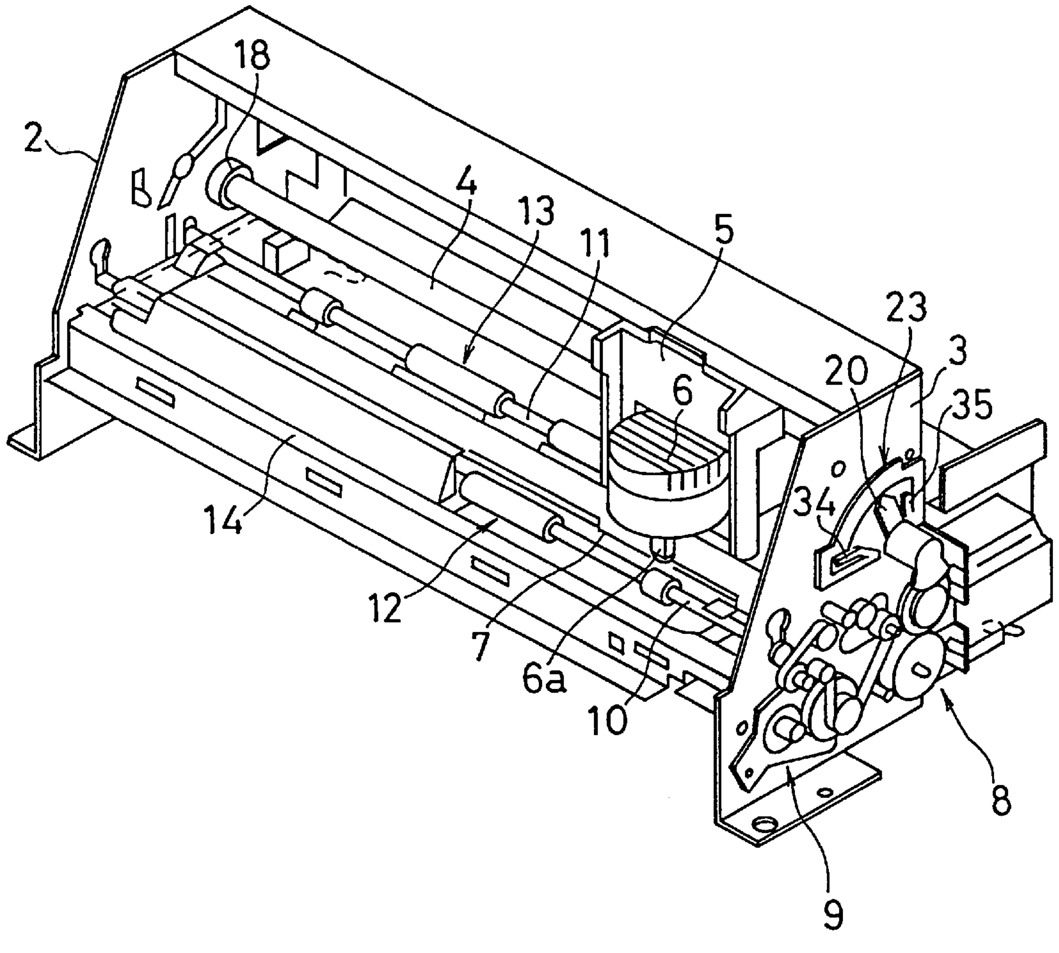
FIG. 1 is a diagonal view of the main parts of an impact dot matrix printer in which a stepping motor drive mechanism according to the present invention is adopted.

An impact dot matrix printer in which the stepping motor drive mechanism of the present invention is applied will now be described with references to FIG. 1.

A carriage shaft 4 is suspended horizontally between a left and a right side frame 2 and 3 that are mutually opposed in a printer 1, supported such that it is movable up and down (as is described below). A carriage 5 is fitted onto the carriage shaft 4 so that it freely slides. A print head 6 is attached to the carriage 5, with its head pins 6*a* facing straight down, by means of machine screws or the like, so that it is removable. A platen 7 is installed directly beneath the path of the print head 6 along the carriage shaft 4, the upper surface of which is flat and parallel with the carriage shaft 4. A paper feed drive mechanism 9 and a head gap adjustment mechanism 8 that moves the carriage 5 up and down are positioned on the outside of the right side frame 3 of the printer 1.

In FIG. 1, moreover, reference numerals 10 and 11 denote roller shafts that are suspended between the left and right side frames 2 and 3 of the printer 1, parallel to the platen 7, front and back, so as to sandwich the platen 7 between them, which freely turn. The roller shafts 10 and 11, respectively, are turned in the direction of paper feed through the paper feed drive mechanism 9. The roller shafts 10 and 11, respectively, are provided with paper feed roller means 12 and 13. Reference numeral 14 denotes a main paper supply opening. The paper is fed from the main paper supply opening 14 horizontally to the print head 6. Between the platen 7 and the tip of the print head 6 is formed a head gap through which the paper passes as it is supplied from the main paper supply opening 14 to the print head.

The head gap adjustment mechanism in the printer 1 will now be described with reference to FIGS. 2 and 3.

Figure 3:
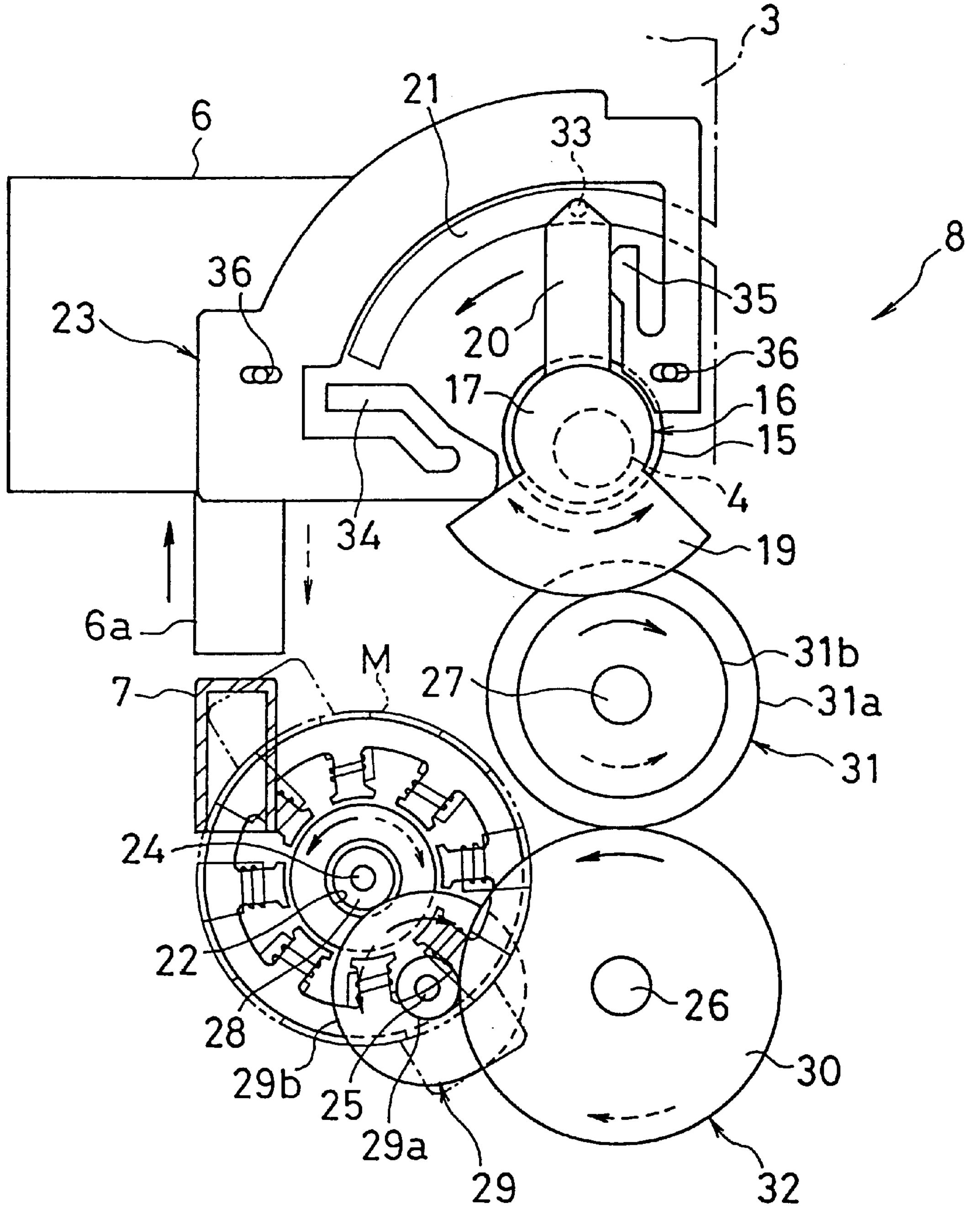
FIG. 3 is a front elevation of the head gap adjustment mechanism positioned on the right side frame of the printer shown in FIG. 1.

As is shown in FIG. 3, a bearing 15 is fixed in the right side frame 3, into which bearing is fitted the shaft unit 17 of a displacement gear member 16 so that it can freely turn. This shaft unit 17 supports the right end of the carriage shaft 4 at a position that is eccentric relative to the center of turning of the shaft unit 17 of the displacement gear member 16.

As shown in FIG. 1, moreover, in the right side frame 2, a bearing 18 is fitted so that it freely turns relative to the side frame 2. This bearing 18 supports the left end of the carriage shaft 4 at the same eccentric position as the right end relative to the center of turning of the bearing 18.

By these means, the carriage shaft 4 is supported suspended horizontally between the left and right side frames 2 and 3, and is displaced up and down by the turning of the displacement gear member 16 that supports one end thereof.

Figure 2:
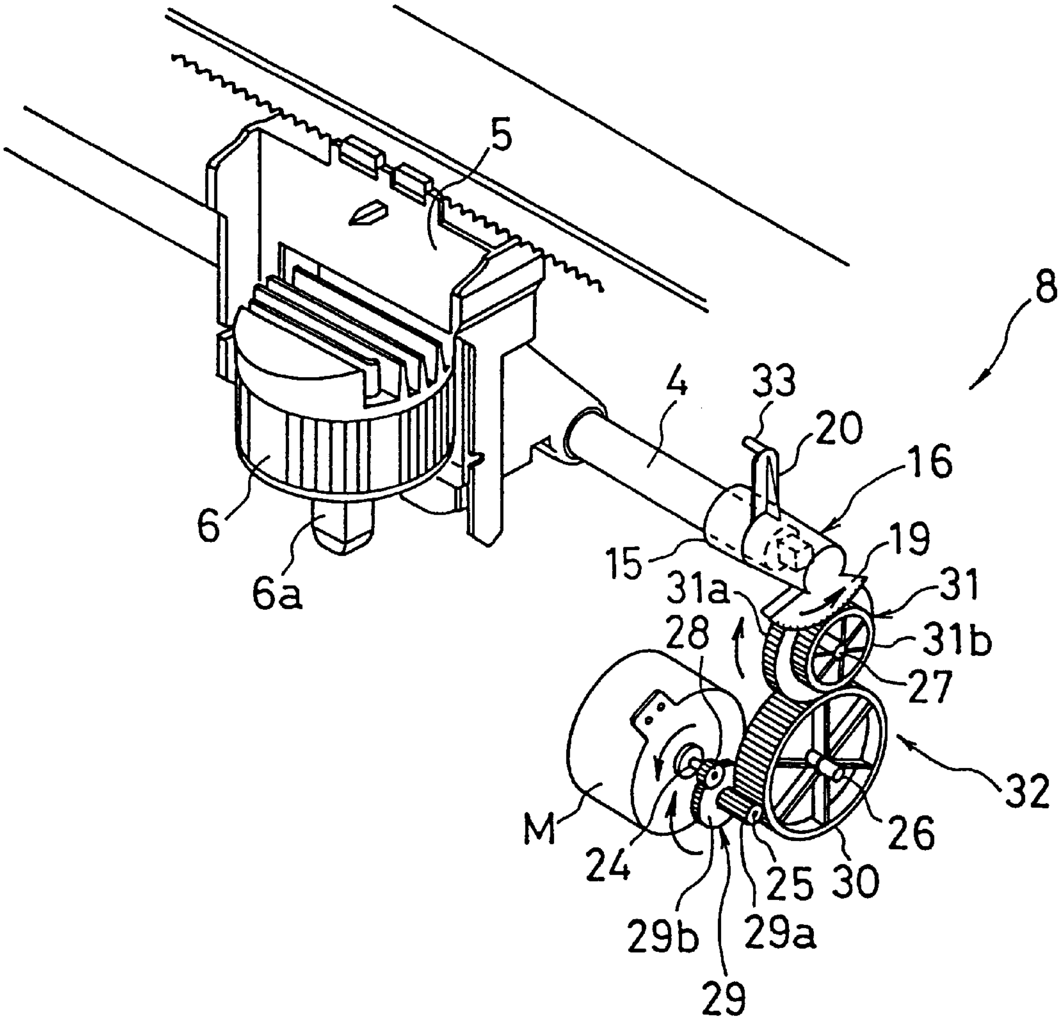
FIG. 2 is a partial enlarged diagonal view of the head gap adjustment mechanism in the printer shown in FIG. 1.

As shown in FIGS. 2 and 3, on the displacement gear member 16 which is supported so that it freely turns by the right side frame 3 is integrally formed a sector gear 19 that extends out from a center that is the center of turning of the displacement gear member 16, and a gap lever 20 is integrally formed, as a movable member, on the opposite side from the sector gear 19, with the center of turning in between.

As shown in FIG. 3, in the side frame 3, a guide hole 21 is formed, shaped as a circular arc, above the displacement gear member 16 and centered on its center of turning, and a through hole 22 is opened below and to the right of this guide hole 21. On the outer surface of the side frame 3, furthermore, a single stopper plate 23 is attached for the circular-arc-shaped guide hole 21. Meanwhile, on the inside of the side frame 3, a stepping motor M is placed to serve as the drive source for the head gap adjustment mechanism 8. The drive shaft 24 of the stepping motor M passes through the through hole 22 in the side frame 3 and protrudes on the outside of the side frame 3. Three shafts, 25, 26, and 27, respectively, are fixed to the side frame 3, oriented toward the outside and parallel to the drive shaft 24.

As shown in FIGS. 2 and 3, a pinion 28 is secured to one end of the drive shaft 24 of the stepping motor M, an idler gear 29 is provided on the shaft 25 so that it freely turns thereon, an idler gear 30 is provided on the shaft 26 so that it freely turns thereon, and an idler gear 31 is provided on the shaft 27 so that it freely turns thereon. On the idler gear 29 are formed teeth in two steps, namely pinion teeth 29*a* and outer teeth 29*b*, in the axial direction. On the idler gear 31 are formed teeth in two steps, namely large-diameter outer teeth 31*a* and small-diameter outer teeth 31*b*, respectively.

The pinion 28 formed on the end of the drive shaft 24 of the stepping motor M engages the outer teeth 29*b* of the idler gear 29. The pinion teeth 29*a* of the idler gear 29 engage the idler gear 30. The idler gear 30 engages the large-diameter outer teeth 31*a* of the idler gear 31. The small-diameter outer teeth 31*b* of the idler gear 31 engage the sector gear 19 of the displacement gear member 16. A speed-reduction gear train 32 is formed by the pinion 28, idler gear 29, idler gear 30, idler gear 31, and sector gear 19. The turning drive force of the stepping motor M is transmitted to the displacement gear member 16 through the speed-reduction gear train 32. Thereupon, the displacement gear member 16 is turned through the bearing 15 provided in the right side frame 3, while the bearing 18 provided in the left side frame 2 turns also, by which means the carriage shaft 4 turns about the turning axis, and the print head is moved up or down together with the carriage 5.

When the displacement gear member 16 turns clockwise in FIG. 3, the carriage shaft 4 descends, and, accordingly, the print head descends straight down. Conversely, when the displacement gear member 16 turns counterclockwise in FIG. 3, the carriage shaft 4 rises and the print head 6 rises straight up. As shown in FIG. 3, moreover, a guide pin 33 is provided on the end of the gap lever 20. This guide pin 33 fits into the circular-arc-shaped guide hole 21 formed in the side frame 3.

The relationship between the head gap and the range of travel of the gap lever 20 is next explained with reference to FIGS. 4 and 5.

The range of travel of the gap lever 20 is restricted by the single stopper plate 23. The gap lever 20 is shown in FIG. 4 at the standard position wherein the head gap becomes maximum. In FIG. 3, on the other hand, the gap lever 20 is shown at a position wherein the head gap becomes minimum.

Figure 4:
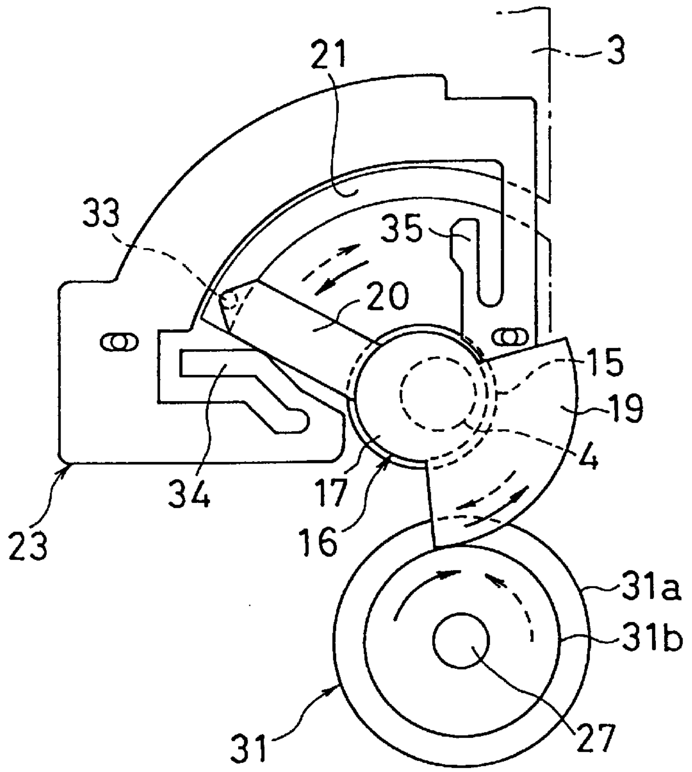
FIG. 4 is a diagram depicting the situation where, in the head gap adjustment mechanism shown in FIG. 3, the head gap is at maximum, with the movable member restricted by a stopper plate.

The stopper plate 23 is provided with a first stopper 34 that is contacted by the gap lever 20 and that restricts displacement in the receding direction of the print head 6 when the stepping motor M in FIG. 3 drives the print head 6 in a direction receding away from the platen 7, as shown in FIG. 4, and with a second stopper 35 that is contacted by the gap lever 20 and that restricts displacement in the approaching direction of the print head 6 when the stepping motor M drives the print head 6 in a direction approaching toward the platen 7.

When the stepping motor M turns in the counterclockwise direction indicated by the solid-line arrow in FIG. 3, driving the print head 6 in a direction receding away from the platen 7, that is considered a forward turning drive, and the direction in which the print head 6 recedes away from the platen 7 is considered the forward direction. Conversely, when the stepping motor M turns in the clockwise direction indicated by the broken-line arrow in FIG. 3, driving the print head 6 in a direction approaching toward the platen 7, that is considered a reverse turning drive, and the direction in which the print head approaches toward the platen is considered the reverse direction.

As shown in FIG. 4, when the gap lever 20 comes up against the first stopper 34, the stepping motor M tries to continue turning, resulting in the stepping motor getting out of step, whereupon the gap lever 20 is put in the initial condition. The amount of turning of the stepping motor M is controlled in terms of the number of steps made from this initial condition, and the gap lever 20 is driven in response to this turning amount. The print head 6 moves up or down in response to the movement of the gap lever 20.

As shown in FIG. 3, the minimum gap between the print head 6 and the platen 7 is restricted by the gap lever 20 coming up against the second stopper 35. This minimum gap is set at a position such that wear does not occur in the print head 6 due to the print head 6 striking the platen 7 when the print head 6 comes up against the platen 7. The stopper plate 23, moreover, is secured to the side frame 3 by laterally long through holes 36 that allow the position in which it is attached to be adjusted horizontally so that the head gap can be finely adjusted.

Figure 5:
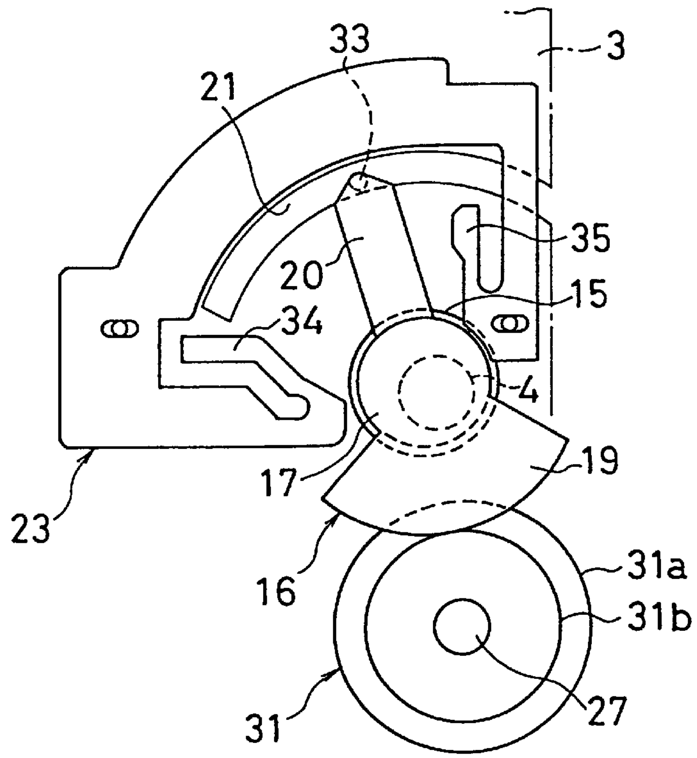
FIG. 5 is a diagram depicting the position (standard position) of the movable member corresponding to the position of the print head in the head gap adjustment mechanism shown in FIG. 3, when there is no paper on the platen.

FIG. 5 is a partial front elevation of the head gap adjustment mechanism 8 depicting the condition in which the gap lever 20 produces the standard position for the print head 6, which is the head gap position when there is no paper on the platen 7. After stopping the gap lever 20 in the standard position shown in FIG. 4, the stepping motor M is reverse-turn driven by a predetermined number of steps, and the gap lever 20 is retracted away from the first stopper 34 and stopped in the standard position.

As will be described below, the stepping motor M comprises a 4-phase permanent magnet stepping motor, wherein the rotor is turned stepwise relative to the stator by excitation phases, namely phase A, phase B, phase C, and phase D, being excited in sequence with a prescribed step period. The gear ratio of the speed-reduction gear train 32 is set at 0.037. When the stepping motor turns through one step, the carriage 5 is moved up or down 0.01 mm (10 $\mu$m).

Figure 6:
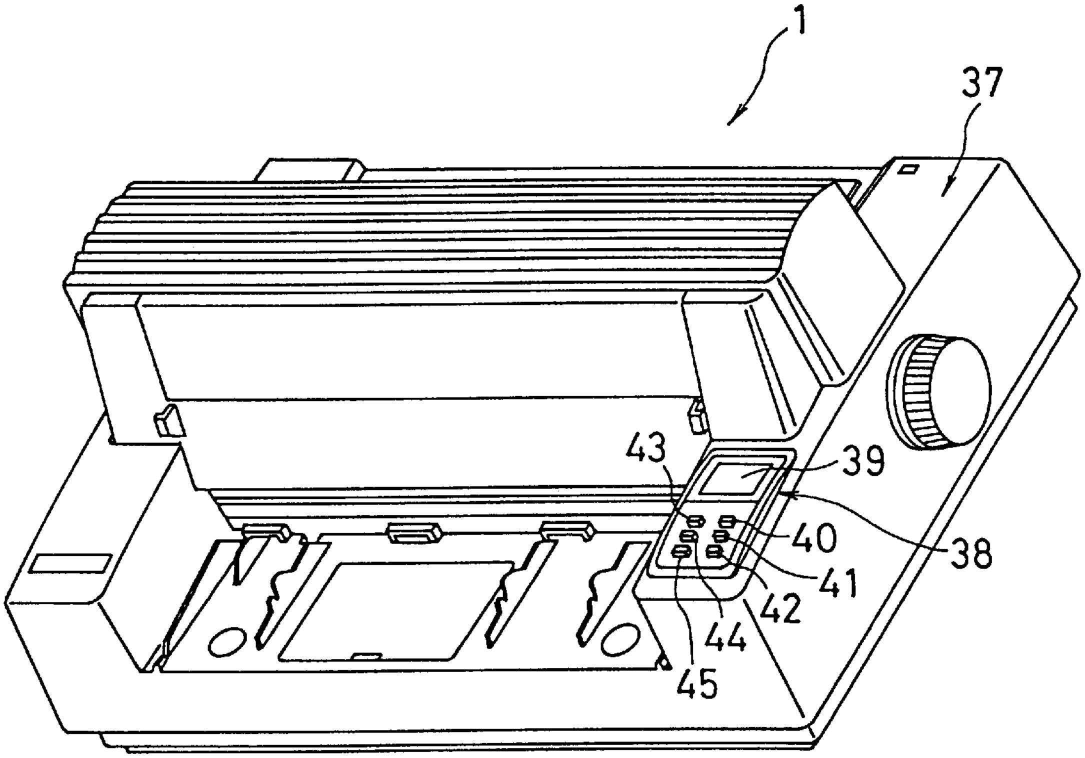
FIG. 6 is a diagonal view of the exterior of an impact dot matrix printer in which a stepping motor drive mechanism according to the present invention has been adopted.

The printer 1 has a control panel 38 provided on top and at one side of a main unit cover 37, as shown in FIG. 6. The control panel 38 is provided with a liquid crystal display (LCD) 39 and input keys 40 through 45.

Figure 7:
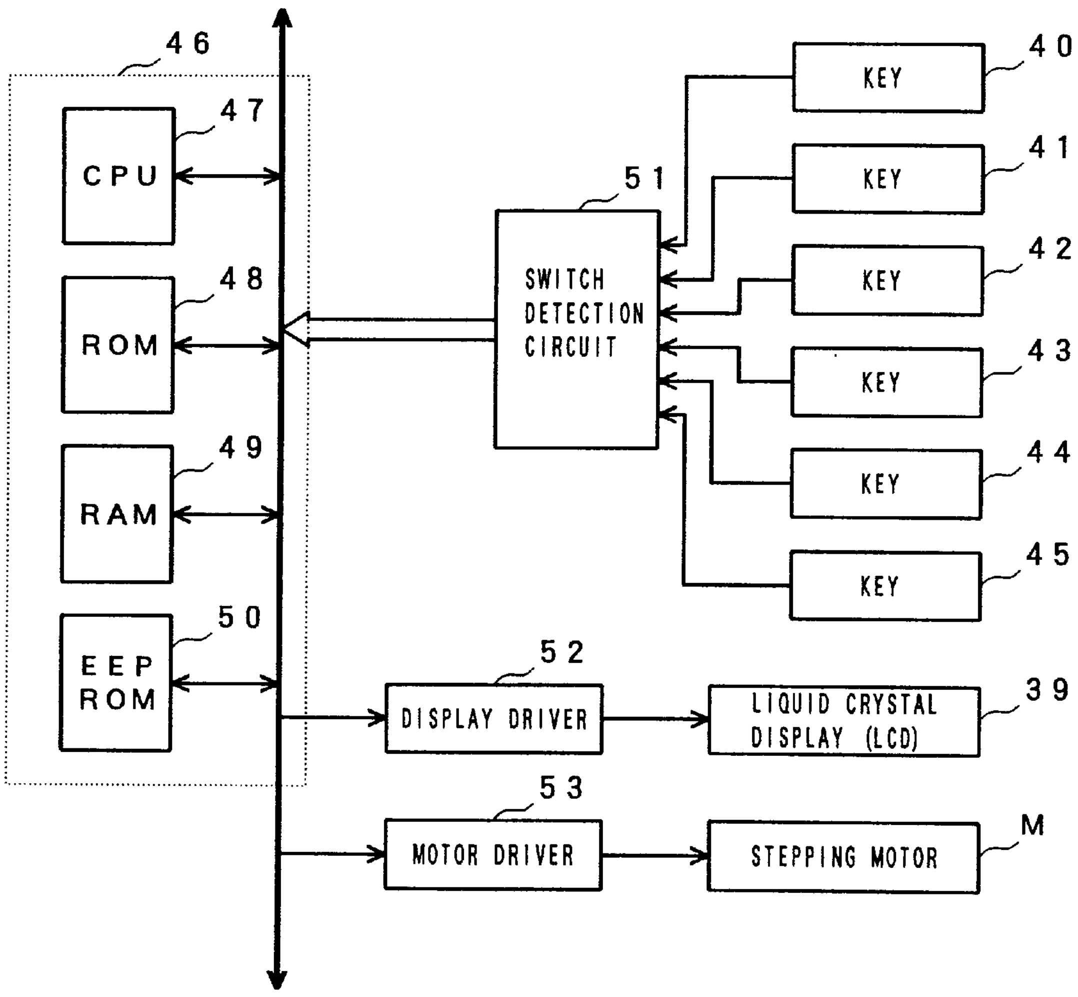
FIG. 7 is a block diagram of the main configurational elements when implementing head gap adjustment using a stepping motor drive mechanism according to the present invention.

The main parts pertaining to adjusting the head gap for the print head 6 are described with reference to the block diagram in FIG. 7.

A control unit 46 for the printer 1 is made up of a CPU 47 that controls the printer drive elements, a ROM 48 which stores the control program executed by the CPU, a RAM 49 to which data can be written and from which data can be read at any time, and an EEPROM 50 to which data can be written and from which data can be read at any time and which preserves data in memory even when the power supply is interrupted.

The ROM 48, RAM 49, and EEPROM 50 are connected by a bus to the CPU 47. To this bus is also connected a switch input detection circuit 51. When inputs are made from the operating keys 40 through 45 provided on the printer apparatus 1, key input signals pass through this switch input detection circuit 51 and are input, either discretely or simultaneously to the CPU 47. A display driver 52 and a motor driver 53 are also connected to the bus. Display outputs from the CPU 47 are transferred to the LCD 39 via the display driver 52 and displayed. The head-gap-adjustment stepping motor M that is for adjusting the carriage and the head gap between the print head 6 and the paper by displacing the carriage shaft 4 up and down operates in response to drive outputs from the CPU 47 via the motor driver 53.

The control program stored in the ROM 48 contains a program for setting the phase (stop phase) which the stepping motor M takes when it starts rotating in the reverse direction, when determining the standard position of the print head 6 relative to the platen 7 by moving the carriage 5 up or down through the head gap adjustment mechanism 8, by driving the stepping motor M. The stop phase obtained by executing this subroutine is stored in the EEPROM 50.

As shown in FIG. 4, when the gap lever 20 comes up against the first stopper 34, the stepping motor M tries to continue turning, and, as a consequence, the stepping motor M gets out of step. In this way the gap lever 20 is put in the initial condition. In cases where the phase (stop phase) which the stepping motor M takes when it stops rotating in this initial condition is not appropriate, however, the stop position for the gap lever 20 is not constant, nor, accordingly, is the standard position that is to be set by beginning from the initial condition of the gap lever 20 and reverse-turn driving the stepping motor M by a predetermined number of steps (cf. FIG. 5). In other words, because the initial condition of the gap lever 20 after turning on the power is not constant, the head gap will not be constant every time the power is turned on, and print quality will not stabilize. In order to resolve this problem, in the present invention, the stop phase is set so that the stop phase of the stepping motor M will be appropriate, so that the initial condition of the gap lever 20 will always be at a stabilized position.

The stepping motor M will now be described briefly with reference to FIGS. 8 and 9.

The stepping motor M is a 4-phase 8-pole permanent-magnet motor. The stator 54 of the stepping motor M is provided with eight pole prongs 55-1, 56-1, 55-2, 56-2, 55-3, 56-3, 55-4, and 56-4, spaced at 45° intervals. Four pole prongs positioned through each 90° sector configure one phase. The motor is configured so that every two pole prongs opposing each other across the center are excited in the same polarity, while adjacent pole prongs are excited in different polarities.

The rotor 57 positioned inside the stator 54 of the stepping motor M is provided with six pole prongs, 58-1, 58-2, 58-3, 58-4, 58-5, and 58-6, spaced at 60° intervals. Each pole prong has a permanent magnet built into it of the same polarity.

Figure 8:
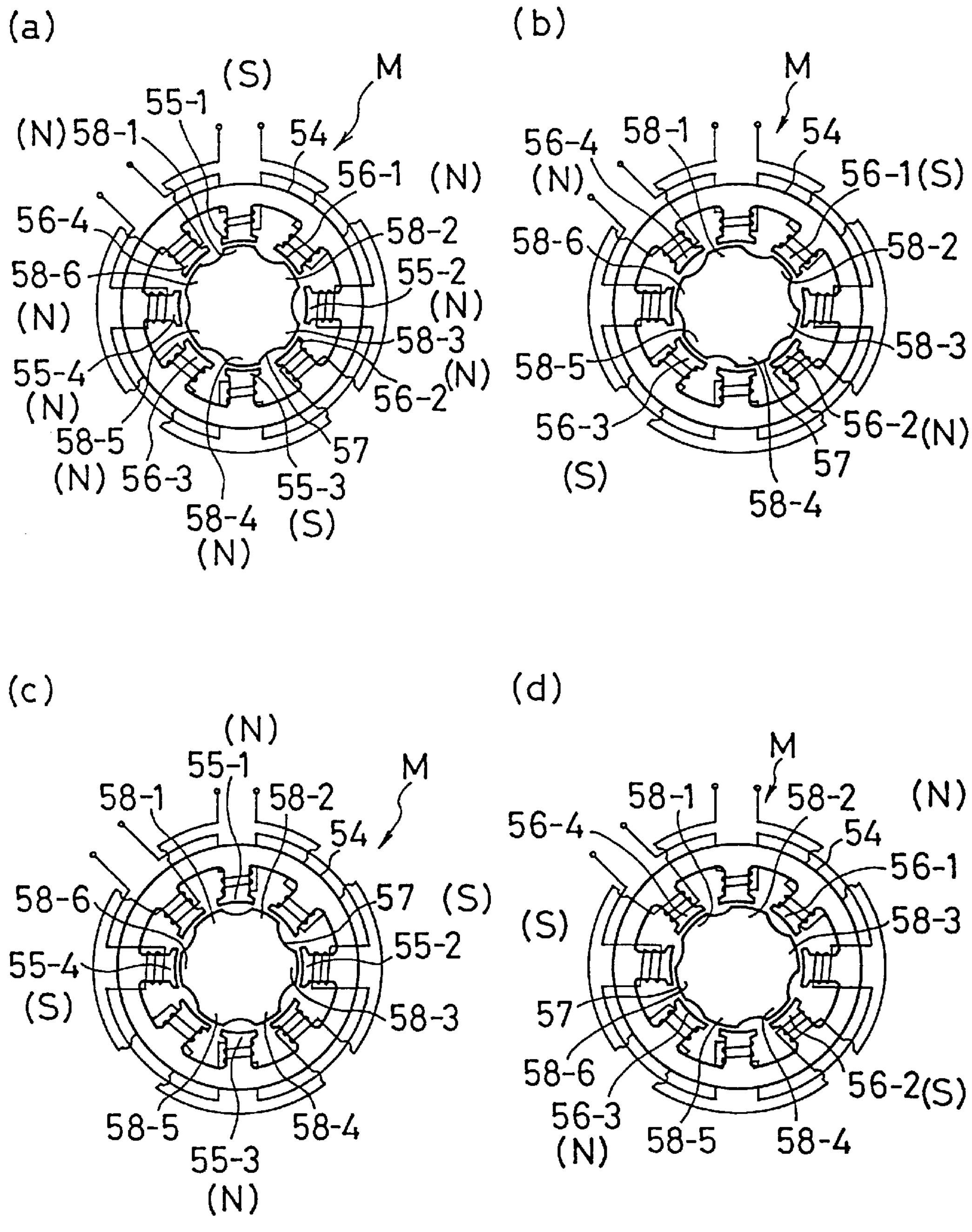
FIG. 8 is a diagram for explaining the turning of a rotor in a stepping motor and includes individual FIGS. 8(*a*), 8(*b*), 8(*c*), and 8(*d*)
Figure 9:
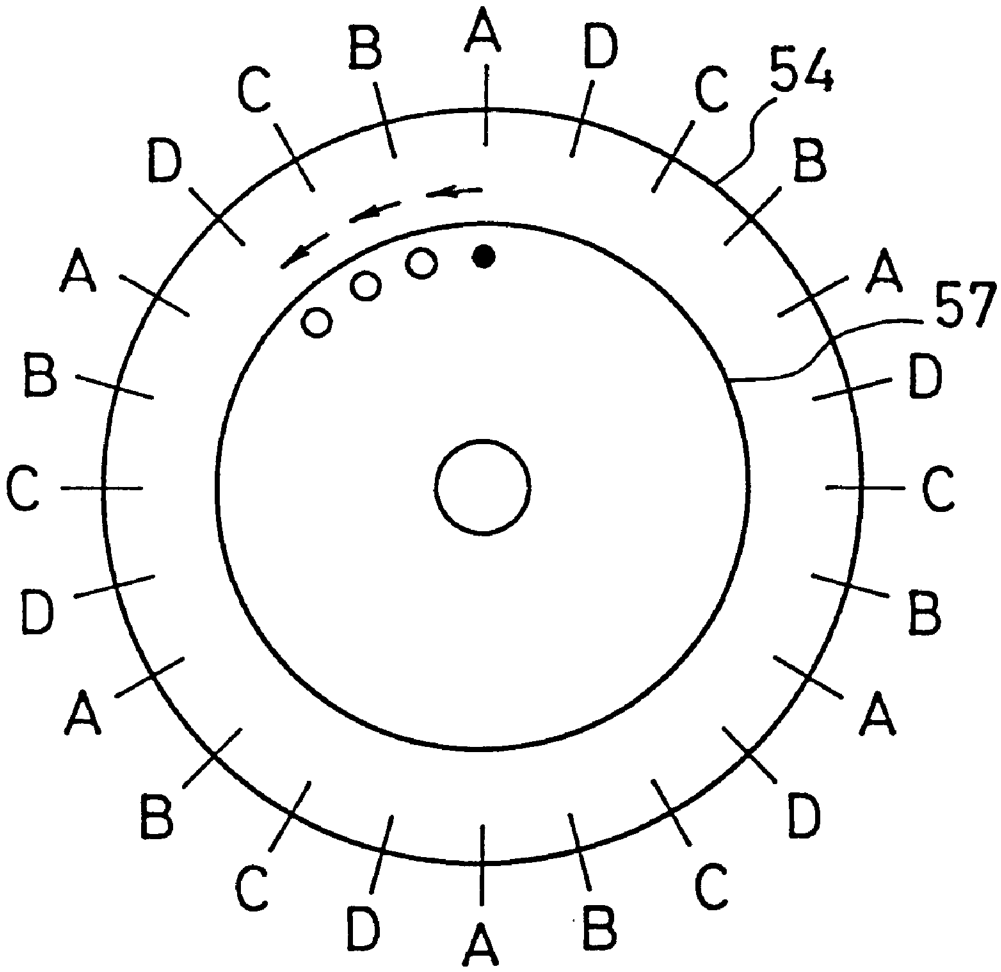
FIG. 9 is a diagram that models the manner in which a stepping motor rotor turns.

In FIG. 8(*a*) is shown the situation where the rotor 57 is stopped, with the pole prongs 55-1 and 55-3 excited to S polarity, and 55-2 and 55-4 to N polarity, by phase A excitation, assuming that each pole prong of the rotor is N polarity.

In the situation where the rotor 57 is stopped in phase A of the stator 54, as shown in FIG. 8(*a*), when the excitation for phase A is turned off and excitation is switched to phase B, the pole prongs 56-1 and 56-3 of the stator 54 will be excited to S polarity, while pole prongs 56-2 and 56-4 are excited to N polarity. Pole prong 56-1 of the stator 54 will pull in the pole prong 58-2 of the rotor 57, and pole prong 56-3 of the stator 54 will pull in the pole prong 58-5 of the rotor 57, whereby the rotor 57 will turn 15° counterclockwise relative to the stator 54.

FIG. 8(*b*) diagrams the situation where the rotor 57 is stopped when excited in phase B. At this time, the pole prongs 56-1 and 56-3 of the stator 54 are excited to S polarity, while pole prongs 56-2 and 56-4 are excited to N polarity.

FIG. 8(*c*) diagrams the situation where the rotor 57 is stopped when excited in phase C. At this time, the pole prongs 55-1 and 55-3 of the stator 54 are excited to N polarity, while pole prongs 55-2 and 55-4 are excited to S polarity.

FIG. 8(*d*) diagrams the situation where the rotor 57 is stopped when excited in phase D. At this time, the pole prongs 56-1 and 56-3 of the stator 54 are excited to N polarity, while pole prongs 56-2 and 56-4 are excited to S polarity.

In the stepping motor M, as described in the foregoing, the rotor 57 is turned in 15° stepping angles counterclockwise relative to the stator 54 by the cyclical switching of stator 5 excitation through phases A, B, C, and D, in that order. FIG. 9 models the way in which the stepping motor M of FIG. 8, as discussed above, turns.

The relationship between the first stopper 34 and the stopping positions of the rotor 57 (and thus of the gap lever 20 which moves integrally therewith) relative to the four phases (i.e. phase A, phase B, phase C, and phase D) of the stator 54 of the stepping motor M is now explained with reference to FIG. 10.

Figure 10:
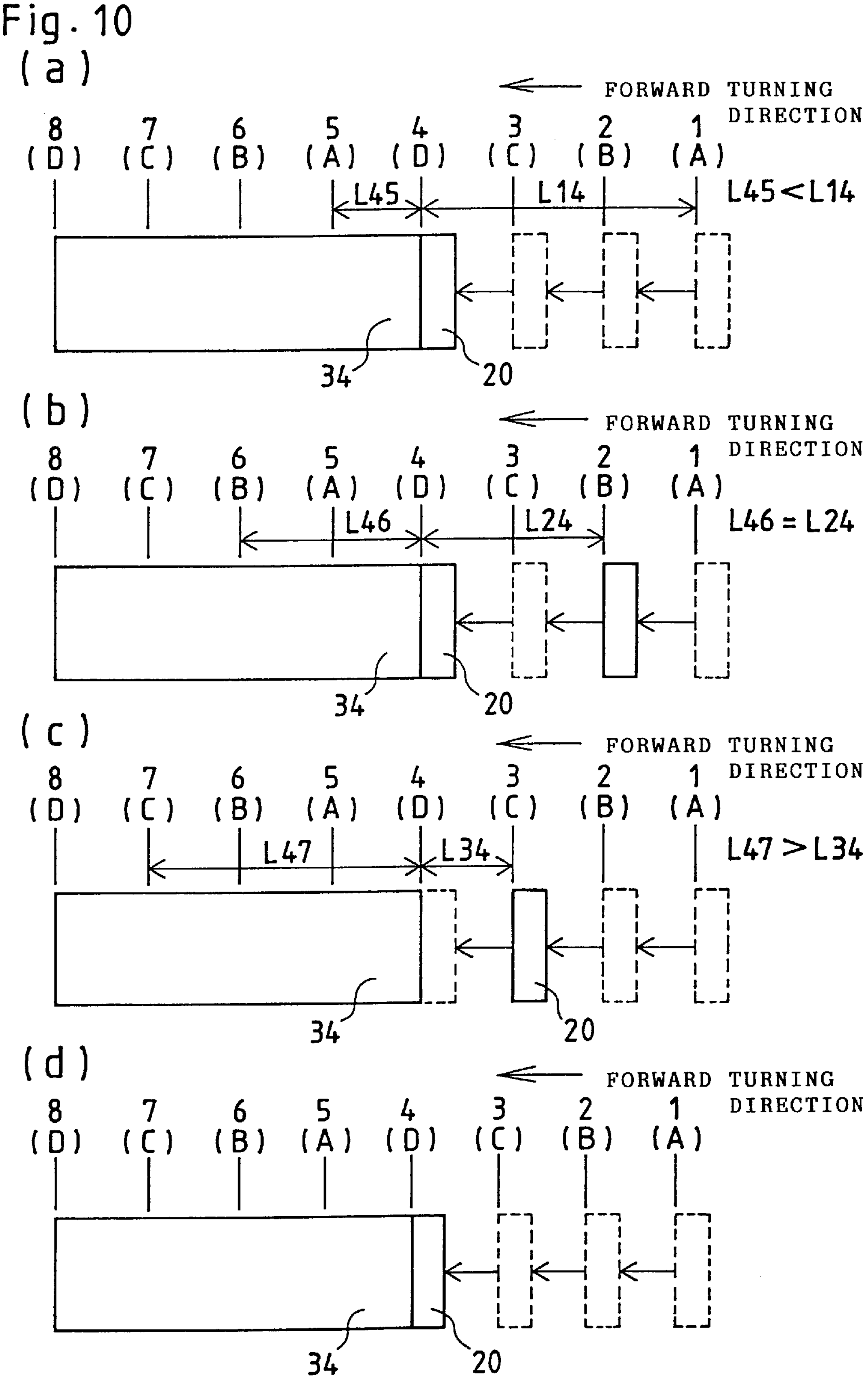
FIG. 10 is a diagram of the relationship between a stopper and the position in which the rotor is stopped relative to each stator phase in a stepping motor and includes individual FIGS. 10(*a*), 10(*b*), 10(*c*), and 10(*d*)

FIG. 10 will now be referenced in describing the movement when the gap lever 20 comes up against the first stopper 34.

In FIG. 10, the positions of the pole prongs of the stepping motor M are indicated by the numbers 1 through 8. As one example, the first stopper 34 is assumed to be positioned near phase D indicated by the number 4.

The gap lever 20 will not come up against the first stopper 34 from numbers 1 through 4, so the first stopper 34, as shown in FIG. 3, is linked to the counterclockwise turning movement of the driveshaft 24 of the stepping motor M. In other words, in the stepping motor M, as shown in FIG. 8, the rotor 57 of the stepping motor M turns counterclockwise one step at a time through a stepping angle of 15°, following the excitation phase of the stator 54 that is switch-excited by the drive pulses.

When the gap lever 20 comes up against the first stopper 34, the counterclockwise turning movement of the gap lever 20 (forward turning of the stepping motor M) is checked by the first stopper 34, and the transmission of the turning force of the speed-reduction gear train 32 shown in FIG. 3 is forcibly stopped. Accordingly, the counterclockwise turning of the driveshaft 24 of the stepping motor M is also forcibly stopped, whereupon the stepping motor M has entered an out-of-step state.

In other words, even when the excitation of the stator 54 of the stepping motor M is cyclically switched from phase A to phase B to phase C to phase D to phase A . . . , in that order, the rotor 57 no longer exhibits a turning motion that follows the excitation phases of the stator 54, but the rotor 57 is in a condition from which it cannot turn further counterclockwise from the state in which it opposes phase D of the stator 54.

Under the presupposed conditions set forth above, the position in which the rotor 57 is stopped will sometimes be stable and sometimes be unstable, depending on the phase (stop phase) at the time that excitation was stopped in order to stop the out-of-step state of the stepping motor M. This will now be explained.

When phase A has been made the stop phase, as shown in FIG. 10(*a*), the rotor 57 that is stopped, having come up to position number 4, is pulled toward numbers 1 and 5 of phase A that is excited. In this case, position number 5 is more proximate than position number 1 to position number 4 in which the rotor 57 has stopped, so the rotor 57 will be pulled in the direction of number 5. However, because the gap lever 20 has come up against the first stopper 34, the rotor 57 cannot move to the position indicated by number 5, and stops in the position indicated by number 4. In other words, the gap lever 20 in FIG. 10(*a*) stops and stabilizes in the position indicated by number 4.

As shown in FIG. 10(*b*), when phase B is made the stop phase, the rotor 57 that is stopped having come up to position number 4 is pulled toward the positions indicated by numbers 2 and 6 of phase B that is excited. In this case, the positions indicated by numbers 2 and 6 are roughly equidistant from position number 4 at which the rotor 57 is stopped. Accordingly, depending on the balance between the pulling forces of the position indicated by number 2 and the position indicated by number 6, and on external forces, etc., it is possible that the rotor 57 will sometimes stop at the position indicated by number 4 and sometimes it will stop after being pulled to the position indicated by number 2. Both cases are possible, so that the stop position of the gap lever 20 becomes always unstable.

When phase C is made the stop phase, as in FIG. 10(*c*), the rotor 57 that has stopped having come up to position number 4 is pulled towards the positions indicated by numbers 3 and 7 of phase C that is excited. In this case, position number 3 is more proximate than position number 7 to position number 4 at which the rotor 57 is stopped, so the rotor 57 will be pulled toward position number 3, and will in fact be pulled from position number 4 to the position indicated by number 3 and stop. Accordingly, in FIG. 10(*c*), the rotor 57 and the gap lever 20 to which it is linked will return to position number 3, away from the first stopper 34 (number 4), and there stop and stabilize.

When phase D is made the stop phase, as in FIG. 10(*d*), the rotor 57 that has stopped having come up to position number 4 is pulled toward position number 4 of phase D that is excited. In this case, the pulling force of position number 8 has no influence on position number 4 at which the rotor 57 is stopped, so the rotor 57 stays stopped at position number 4. Accordingly, in FIG. 10(*d*), the gap lever 20 is pulled to the position indicated by number 4 and there stops and stabilizes.

In this manner, when the first stopper 34 is in the vicinity of phase D, the position of the gap lever 20 becomes unstable when the stop phase of the stepping motor M is made phase B. When the first stopper 34 is outside the vicinity of phase D, the position of the gap lever 20 will become unstable when the stop phase is made a position that is shifted two positions away from the phase in the vicinity by the first stopper 34. In other words, when the first stopper 34 is in the vicinity of phase A, the position of the gap lever 20 when phase C is made the stop phase becomes unstable. When the first stopper 34 is in the vicinity of phase B, the position of the gap lever 20 when phase D is made the stop phase becomes unstable. And when the first stopper 34 is in the vicinity of phase C, the position of the gap lever 20 when phase A is made the stop phase becomes unstable. Accordingly, when the stop phase of the stepping motor M is appropriately selected, the stop position of the rotor 57 will stabilize when the stepping motor drive stops.

Next will be described the method of positioning the rotor 57 relative to the 4-phase stator 54 of the stepping motor M, by the drive of the stepping motor M, when determining the standard position of the print head 6 relative to the platen 7, moving the carriage 5 up or down through the head gap adjustment mechanism 8.

In order to actually measure the head gap, the print head 6 attached to the carriage 5 is removed, and in its place a measurement jig is attached to the carriage 5.

Figure 11:
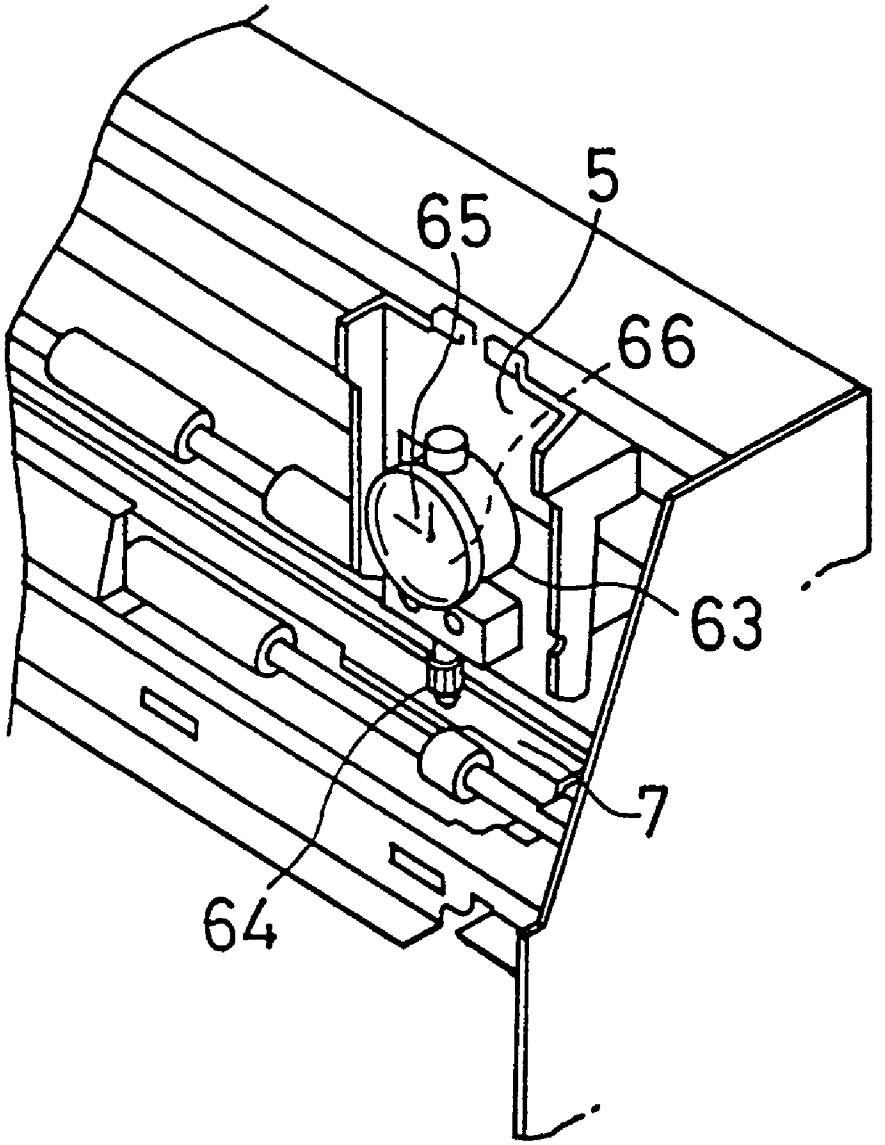
FIG. 11 is a diagonal view of a head gap measuring jig and dial gauge used when making stepping motor positioning adjustment by using a stepping motor drive mechanism according to the present invention.

FIG. 11 is a diagonal view representing the condition in which a dial gauge 63 is attached as a head gap measurement jig to the head attachment unit of the carriage 5. A contact piece 64 of the dial gauge 63 contacts the platen 7, and head gap measurements are made analogically to a precision of 5 μm by the position of a turning needle 65, according to a measured value dial face 66.

To begin with, the stepping motor M is driven forward by a first number of steps and stopped, the carriage 5 is moved in the direction that opens up the head gap, and the gap lever 20 is brought up against the first stopper 34 and stopped. The first number of steps, moreover, is a number that is greater than the number of steps corresponding to the movable range of the gap lever 20, so that the gap lever 20 will be brought up against the first stopper 34.

Next, the stepping motor M is driven in reverse by a second number of steps and stopped, the carriage 5 is moved in the direction that narrows the head gap, and the gap lever 20 is stopped in the standard position. The second number of steps, moreover, is a number that is smaller than the number of steps corresponding to the movable range of the gap lever 20, so that the gap lever 20 will be stopped within its movable range.

In response to the movement of the carriage 5, the contact piece 64 of the dial gauge 63 that is secured to the carriage 5 extends or retracts so as to maintain contact with the platen 7. The measured value varies analogically in response to this extension and retraction, according to the turning needle 65. The measured value indicated by the turning needle 65 on the dial gauge 63 when the gap lever 20 is stopped at the standard position is read. This measured value is compared to a rated value predetermined as self-evident for a standard position value, and a verification is made to see whether the measured value is in error by one step (10 μm) of the stepping motor M.

In the event that an error has occurred, the stop phase of the stepping motor M is altered (that is, the first number of steps is changed), and, once again, the stepping motor M is driven forward, the gap lever 20 is brought up against the first stopper 34, and the stepping motor is put out of step. After that, the stepping motor M is stopped in the stop phase as altered. Then the stepping motor M is driven in reverse the second number of steps and stopped. Then the measured value indicated by the turning needle 65 on the dial gauge 63 is read, and this measured value is compared to the rated value predetermined as self-evident for the value of the standard position. When no error has occurred in the measurement operation described above, the setting of the positioning of the rotor 57 relative to the 4-phase stator of the stepping motor M is terminated.

Figure 12:
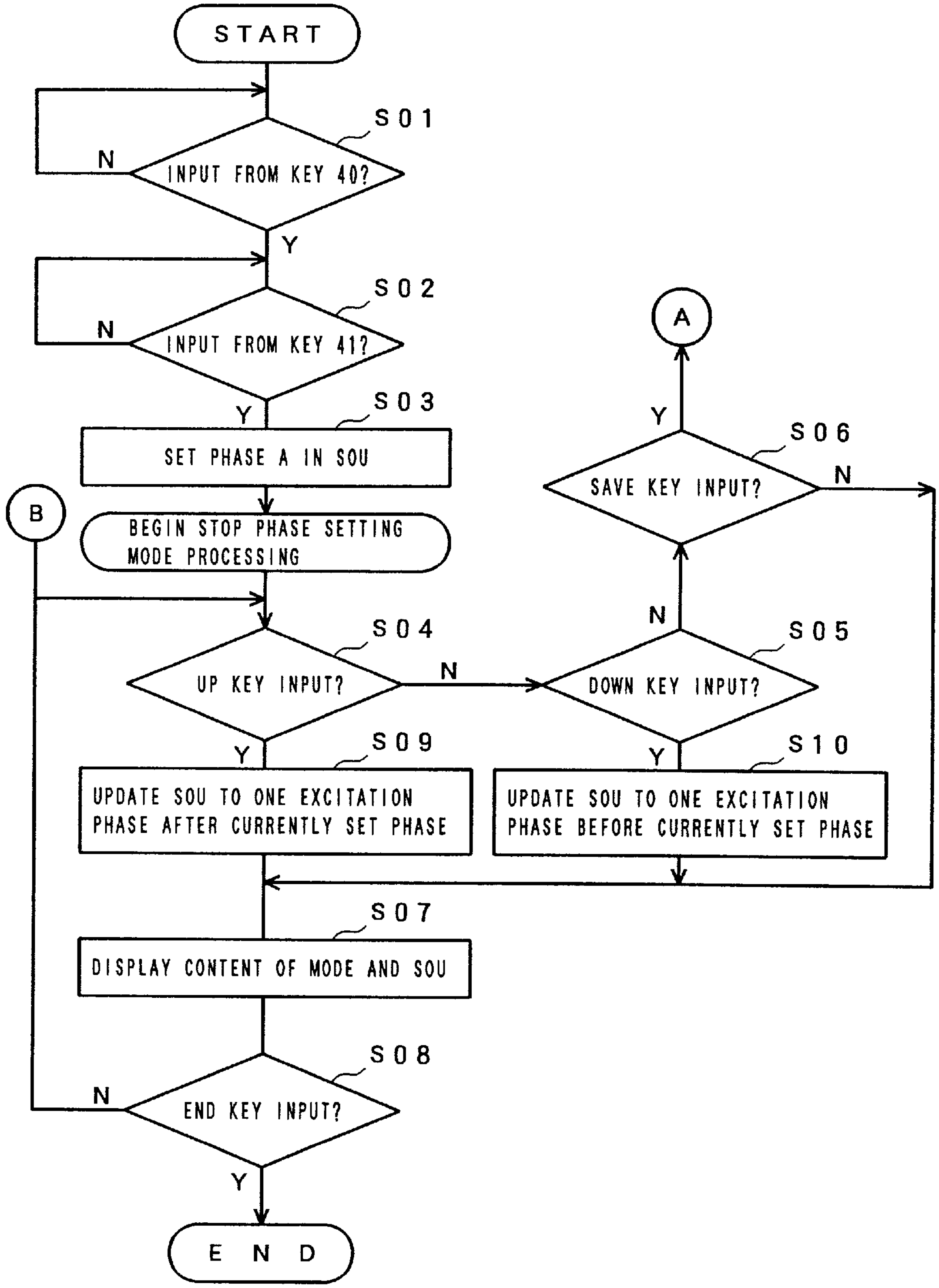
FIG. 12 is a process flowchart for performing stepping motor positioning adjustments using a stepping motor drive mechanism according to the present invention.
Figure 13:
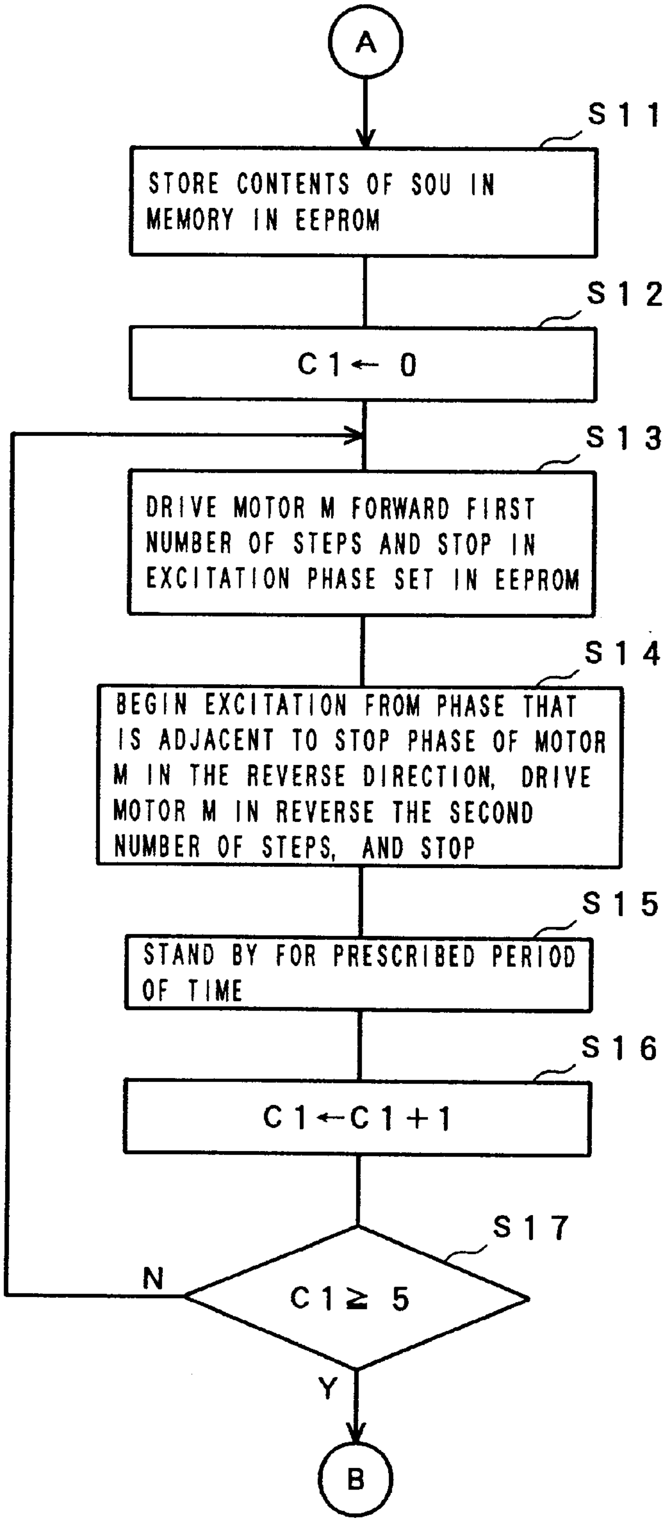
FIG. 13 is a continuation of the flowchart shown in FIG. 12.

The positioning of the rotor 57 of the stepping motor M is next described, making reference to the flowcharts given in FIGS. 12 and 13 for the positioning program executed by the CPU 47.

After the power is turned on, the CPU 47 decides whether or not to execute rotor positioning processing for the stepping motor M. The operator makes inputs using the input keys 40 and 41 on the control panel 38, putting the printer 1 in the stop phase setting mode.

After the power is turned on, the CPU 47 determines whether or not there is an input from input key 40 (step S01). If there has been no input from input key 40, the decision process of step S01 is repeated and a standby state is entered. When there is an input from input key 40, the CPU 47 advances to step S02 and determines whether or not there has been an input from input key 41 (step S02). If there has been no input from input key 41, the CPU repeats the decision process of step S02, entering a standby state.

When there is an input from the input key 41, the CPU 47 sets a value in a stop phase memory register SOU that specifies phase A, and provisionally sets phase A as the stop phase (step S03). After that, the CPU 47 starts the stop phase setting mode processing and advances to the processes from step S04 on.

Figure 14:
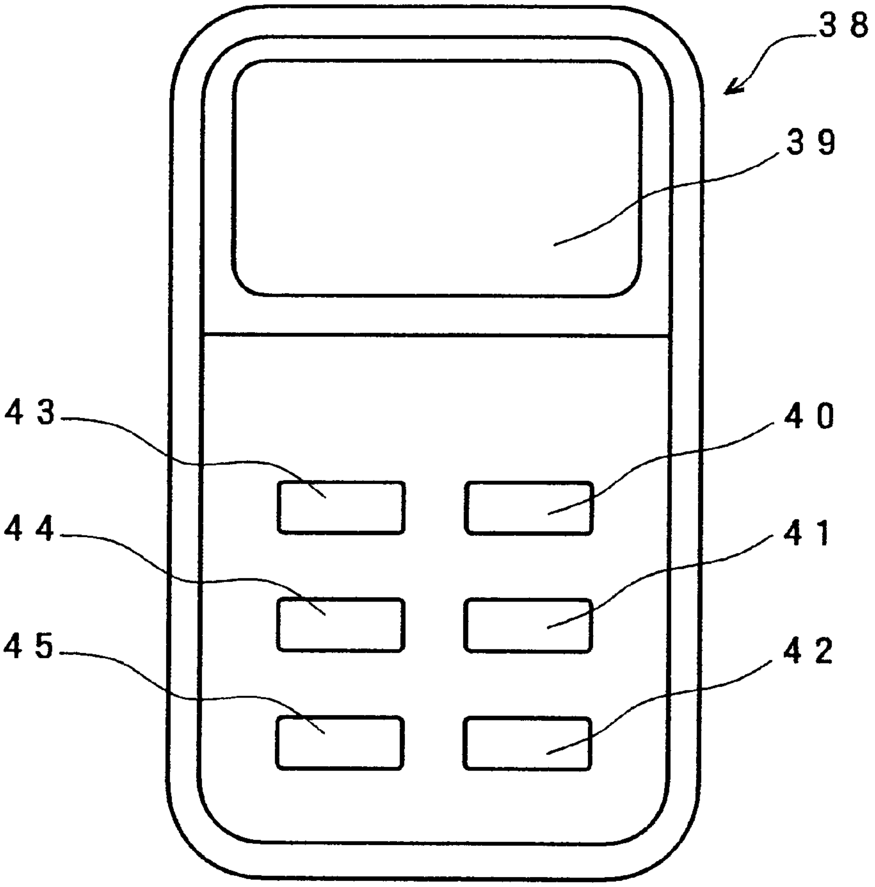
FIG. 14 depicts a control panel used when executing the processes flowcharted in FIGS. 12 and 13.

FIG. 14 is a figure that indicates the function assignments to the input keys 40 through 45 on the control panel in the stop phase setting mode processing. As indicated in FIG. 14, at the point in time where the CPU 47 has moved to the stop phase setting mode processing, the following functions are assigned to the input keys 41, 42, 43, and 45 on the control panel 38.

Input key 41=up key
Input key 42=down key
Input key 43=save key
Input key 45=end key No functions are assigned to input keys 40 and 44.

By pressing the up key 41, the value of the stop phase currently set in the stop phase memory register SOU is changed to the value of the next excitation phase. If, for example, phase A is set as the current stop phase in the stop phase memory register SOU, by pressing the up key 41 one time, the stop phase set in the stop phase memory register SOU is changed to phase B. Similarly, if the value currently set is phase B, then the stop phase is changed to phase C, if the value currently set is phase C then the stop phase is changed to phase D, and if the value currently set is phase D then the stop phase is changed to phase A.

By pressing the down key 42, the value of the stop phase currently set in the stop phase memory register SOU is changed to the value of the excitation phase immediately prior thereto. If, for example, phase A is set as the current stop phase in the stop phase memory register SOU, pressing the down key 41 one time changes the stop phase set in the stop phase memory register SOU to phase D. Similarly, if the value currently set is phase B, then the stop phase is changed to phase A, if the value currently set is phase C then the stop phase is changed to phase B, and if the value currently set is phase D then the stop phase is changed to phase C.

By pressing the save key 43, the stop phase particulars currently set in the stop phase memory register SOU are transferred to an EEPROM 50 and stored there. When the end key 45 is pressed, the stop phase setting mode processing of the CPU 47 is terminated.

After the step S03 processing, the process advances to the stop phase setting mode processing of step S04 and following, whereupon it sequentially determines whether or not there has been input from the up key 41, down key 42, save key 43, or end key 45.

In step S04, a determination is made as to whether or not there is an input from the up key 41 (step S04). By pressing the input key 41, when the process has advanced to step S04 through steps S02 and S03, it is assumed that the operator has not yet made any input with the up key 41, down key 42, save key 43, or end key 45. Accordingly, the CPU 47 judges step S04 to be false, and the process advances to step S05.

In step S05, a determination is made as to whether or not there is an input from the down key 42 (step S05). By the same reasoning as set forth for step S04 above, the CPU 47 judges step S05 to be false, and the process advances to step 06.

In step S06, a determination is made as to whether or not there is an input from the save key 43 (step S06). By the same reasoning as set forth for step S04 above, the CPU 47 judges that step S06 is false, and the process advances to step S07.

Figure 15:
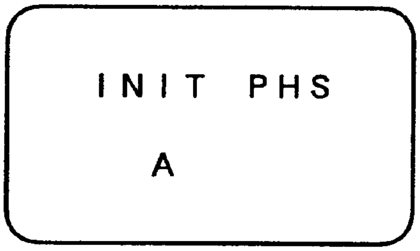
FIG. 15 is a liquid crystal display used when executing the processes flowcharted in FIGS. 12 and 13.

In step S07, the CPU 47 displays on the LCD 39 a mode which indicates the stop phase setting mode and, at the same time, displays the particulars of the stop phase currently set in the stop phase memory register SOU (step S07). In FIG. 15 is given an example where the mode and the stop phase particulars are displayed on the LCD 39. FIG. 15 represents a case where phase A is set as the stop phase. The process, after executing step S07 processing, advances to step S08.

In step S08, a determination is made as to whether or not the end key 45 has been pressed (step S08). By the same reasoning as set forth for step S04 above, the CPU 47 judges that step S08 is false, and the process returns to step S04.

After that, until the operator makes an input from one or other of the up key 41, down key 42, save key 43, or end key 45, the CPU 47 remains in a standby state wherein it repeatedly executes the key function wait processing loop made up of steps S04, S05, S06, S07, S08, and S04.

After verifying the stop phase particulars displayed on the LCD 38, the operator makes an input with one or the other of the up key 41, down key 42, save key 43, or end key 45. In this case, the operator has not taken a reading of the measured value made by the dial gauge 54 for one of the stop phases, namely phases A through D. Therefore, the operator, for the case where the stop phase is phase A, turns the stepping motor M forward by the first number of steps and stops it, then turns the stepping motor M in reverse by the second number of steps and stops it, and then reads the measured value indicated on the dial gauge 54. In this embodiment, moreover, for one stop phase that is set, the measurement operation described above is repeated five times.

The operator presses the save key 43 in order to start the measurement operation for the case where the stop phase is phase A. The CPU 47 judges the decision process of step S06 to be true, and the process advances to steps S11 and following.

The CPU 47, having advanced to step S11, takes the stop phase particulars currently set in the stop phase memory register SOU, transfers them to the EEPROM 50, and holds them there in memory (step S11). If this is the case, phase A will be held in memory in a prescribed memory area in the EEPROM 50 as the stop phase particulars. Next, the CPU 47 clears a number-of-measurements counter C1 to 0 (step S12) and the process advances to the measurement operation processing routine in steps S13 and following.

In step S13, the CPU 47, via the motor driver 53, turns the stepping motor M forward by the first number of steps, and stops in the phase (stop phase) currently held in memory in the EEPROM 50 (step S13). As already explained, the first number of steps is a number that is larger than the number of steps that corresponds to the movable range of the gap lever 20. Therefore, after the gap lever 20 has come up against the first stopper 34 and the stepping motor M has entered an out-of-step state, the rotor 57 is stopped in the stop phase for the rotor 57 recorded in the EEPROM 50, and the gap lever 20 is stopped in the standard position.

At the point in time where the stepping motor M starts to turn forward, the stop position of the rotor 57 relative to the stator 54 is unstable. More specifically, it is indefinite as to which of the phases of the stator 54, phases A through D, the rotor 57 has stopped in. For this reason, it is provisionally assumed that, at the point in time where the motor M began turning forward, the rotor 57 was stopped in phase A of the stator 54. Then the excitation during forward turning is started from phase B, and excitations are made by the drive pulses sequentially through phases C, D, A, B, C, . . . , effecting a forward-turning drive one step at a time.

When the drive has finished moving through the preset first number of steps, the stepping motor M stops. The phase in which it stops (stop phase) is determined by the forward-turning start phase and the number of poles in the stepping motor M.

For example, with a 4-phase stepping motor M (having phases A, B, C, and D), if forward turning starts from phase B and passes through a first number of steps that is a multiple of 4, the stop phase will be phase A. If the first number of steps is made a value that is a multiple of 4, plus 1, the stop phase will be phase B. Similarly, if the first number of steps is made a value that is a multiple of 4, plus 2, the stop phase will be phase C, and if the first number of steps is made a value that is a multiple of 4, plus 3, the stop phase will be phase D. By selecting the first number of steps in this manner, the stop phase can be selected.

In the case, for example, where phase A is set in the stop phase memory register SOU, at the point in time where phase A of the stator 54 is excited, the rotor 57 stops turning. At this point of stopping, however, because the stop phase is phase A, for example, if the first stopper 34 is in the vicinity of phase C, as discussed earlier, the position of the gap lever 20 will be unstable.

After the processing of step S13, the CPU 47, via the motor driver 53, starts driving from the phase that is adjacent to the stop phase of the stepping motor M with the gap lever 20 coming up against the first stopper 34, toward the direction of reverse turning of the stepping motor M, drives the stepping motor M through the second number of steps, and stops it (step S14).

More specifically, the CPU 47 sets the reverse start phase for reverse turning, according to which stop phase is stored in the EEPROM 50, drives in the reverse direction, by means of drive pulses, the second number of steps, beginning from the drive start phase that has been set, and thereby turns the stepping motor M in reverse and stops it. If the stop phase is phase A, for example, phase D is set as the drive start phase for reverse turning, and driving is done, by means of drive pulses, through the second number of steps, in cyclical fashion, sequentially through phases D, C, B, A, D, . . . When the stop phase is phase B, phase A is set as the drive start phase for reverse turning, and driving is done by drive pulses through the second number of steps, through phases A, D, C, B, A, . . . Similarly, when the stop phase is phase C, phase B is set as the drive start phase for reverse turning, and when the stop phase is phase D, phase C is set as the drive start phase for reverse turning, and driving is done by sequential drive pulses through the second number of steps.

After processing in step S14, standby is implemented for a prescribed period of time (step S15). As described earlier, by turning the stepping motor M in reverse by the second number of steps and stopping it, the gap lever 20 is stopped at the standard position indicated in FIG. 5. While the CPU 47 is standing by the prescribed period of time according to step S15, let us say for 1 second, for example, the operator reads the measured value of the head gap indicated by the dial gauge.

When the prescribed period of time has elapsed since the point in time when process moves to step S15, the processing advances to the next step, and the CPU 47 increments the value in the number-of-measurements counter C1 (step S16) and determines whether or not the value of the number-of-measurements counter C1 has reached the prescribed number of measurements 5 (step S17).

If the value in the number-of-measurements counter C1 has not attained 5, that is, the prescribed number of measurements, the process returns to step S13 and the CPU 47 executes the measurement operation processing routine contained in steps S13 through S17. Thereafter, the CPU 47 repeats the measurement operation processing routine of steps S13 through S17 until the value in the number-of-measurements counter C1 reaches the prescribed number of measurements 5.

Then, when the value in the number-of-measurements counter C1 has reached the prescribed number of measurements 5, the CPU 47 judges the decision process of step S17 to be true, the process returns all the way back to step S04, and proceeds to the key operation wait processing loop. As a result, the operator can read the five measured values of the head gap from the dial gauge 63 for the stop phase currently set in the stop phase memory register SOU, which, in this example case, happens to be phase A.

The operator then compares the five measured values obtained against the rated value predetermined to be self-evident as a value for the standard position, and verifies whether or not an error occurs in the five measured values that is equivalent to one step (10 μm) of the stepping motor.

When the five measured values have been studied and an error is found to have occurred, the stop phase of the stepping motor M is altered by pressing either the up key 41 or the down key 42.

When the operator has pressed the up key, the CPU 47 recognizes the decision process in step S04 to be true, and updates the setting of the particulars of the stop phase currently set in the stop phase memory register SOU to those of one phase later (step S09). It then performs the processing in step S07, and displaying on the LCD 38 the particulars of the altered excitation phase, together with the stop phase setting mode. Then, after recognizing the decision process of step S08 to be false, the process returns to step S04 and proceeds to the key operation wait processing loop. What was said earlier applies to the particulars of the changed setting. For example, in the case where phase A is set as the current stop phase in the stop phase memory register SOU, by pressing the up key 41 one time, the stop phase set in the stop phase memory register SOU is changed to a setting of phase B.

When the operator has pressed the down key 42, on the other hand, the CPU 47 judges the decision processing of step S05 to be true, resets the stop phase particulars currently set in the stop phase memory register SOU to the excitation phase immediately prior thereto (step S10), executes the step S07 processing, displays on the LCD 39 both the particulars of the altered excitation phase, together with the stop phase setting mode, and judges the decision process of step S08 to be false. After that the process returns to step S04 and proceeds to the key operation wait processing loop. What was said earlier applies to the particulars of the setting change. For example, in the case where phase A has been set as the current stop phase in the stop phase memory register SOU, by pressing the down key 42 one time, the stop phase set in the stop phase memory register SOU is changed to a setting of phase D.

By pressing the save key, the operator initiates execution of the processing from step S11 and following, using the altered stop phase. The CPU 47 judges the determination in step S06 to be true, places the particulars of the altered stop phase in memory in the EEPROM 50 using step S11, and sequentially executes step S12. Then it repeats the measurement operation processing routine contained in steps S13 through S17 five times, and the processing returns again to step S04 and proceeds to the key operation wait processing loop. As a result, the measured values for the head gap are read off of the dial gauge 63 by the operator for the altered stop phase. These five measured values are compared to the rated value predetermined as self-evident as a value for the standard position, and a decision is made as to whether or not these the five measured values have an error equivalent to one step (10 μm) of the stepping motor M.

Then, when the five measured values have been studied and an error is found to have occurred, the stop phase of the stepping motor M is altered by again pressing either the up key 41 or the down key 42, the save key 43 is pressed, and the particulars of the altered stop phase are placed in memory in the EEPROM 50. Five measured values for the head gap are then obtained by the operator from the dial gauge 63 for the altered stop phase. These five measured values are compared against the rated value predetermined as self-evident as a value for the standard position, and a decision is made as to whether or not these five measured values have an error that is equivalent to one step (10 μm) of the stepping motor M.

The operator then compares the five measured values so obtained from the measurement operation processing loop contained in steps S13 through S17 against the rated value predetermined to be self-evident as a value for the standard position. When the five measured values have no error equivalent to one step (10 μm) of the stepping motor M, the operator judges the setting of the positioning of the rotor relative to the 4-phase stator of the stepping motor M to be concluded and presses the end key 45. The CPU 47 judges the determination in step S08 in the key operation wait processing loop to be true and terminates stop phase setting mode processing. The particulars of the stop phase set in the stop phase memory register SOU are stored in the EEPROM 50 by the processing of step S11.

Then the dial gauge 63 is removed from the head attachment unit in the carriage 5 and the print head 6 is again attached to the head attachment unit in the carriage 5.

The stop phase particulars stored in the EEPROM 50 are used when determining the standard position for the print head relative to the platen 7 by moving the carriage 5 up or down through the head gap adjustment mechanism 8 by means of the drive of the stepping motor M after the power is turned on to the printer 1.

More particularly, at the start, the stepping motor M is driven forward by the first number of steps and stopped, the print head 6 is moved in the direction that opens up the head gap, causing the gap lever 20 to come up against the first stopper 34, and putting the stepping motor M out of step. Then the stepping motor M is driven in the phase (stop phase) stored in memory in the EEPROM 50 and stopped. In this manner, the stop phase of the rotor 57 relative to the stator 54 of the stepping motor M is definitely established so that there is no variation therein, and the position of the gap lever 20 is stabilized in the standard position with no error. Next, the stepping motor M is driven in reverse through the second number of steps from the phase adjacent to the stop phase in the direction toward reverse turning, referenced against the standard position. The standard position of the print head 6 produced in this way is stabilized, that is, the head gap for the print head when there is no paper is kept within the rated error range, and it becomes possible to stably maintain the desired print quality.

Now, using FIG. 10, the positioning of the rotor relative to the stator is described further. (1) When, as in FIG. 10(*a*), the gap lever 20 is at position 4:

With the 1st step

Phase D excitation→gap lever does not move

With the 2nd step

Phase C excitation→gap lever moves to 3

With the 3rd step

Phase B excitation→gap lever moves to 2

With the 4th step

Phase A excitation→gap lever moves to 1

(2) In FIG. 10(*b*), among the five measurements, those wherewith the gap lever begins to turn in reverse from position 4 and those wherewith it begins to turn in reverse from position 2 are mixed, so that variation develops in the measured values.

(3) When, as in FIG. 10(*c*), the gap lever 20 is at position 3:

With the first step

Phase B excitation→gap lever moves to 2

With the second step

Phase A excitation→gap lever moves to 1

(4) When, as in FIG. 10(*d*), the gap lever 20 is at position 4:

With the first step

Phase C excitation→gap lever moves to 3

With the second step

Phase B excitation→gap lever moves to 2

With the third step

Phase A excitation→gap lever moves to 1

Thus from the start of reverse turning of the motor M, it takes 4 steps to reach position 1 in the case of FIG. 10(*a*), 2 steps in the case of FIG. 10(*c*), and 3 steps in the case of FIG. 10(*d*).

Suppose that the motor M starts moving from the position where the rotor is in the state shown in FIG. 10(*a*) and moves by prescribed number of steps to reach a position, and then the position which the motor M reached is determined as the standard position. In the case, at (b) in FIG. 10 there will be variation in the measured values, at (c) a 2-step shift will develop, and at (d) a 1-step shift will develop. Accordingly, what is set is the case shown at (a) in FIG. 10, and neither (c) nor (d) will be selected even though it be stable.

As described in the foregoing, when based on the stepping motor M drive mechanism, in a printer 1 comprising a gap lever 20 driven by the stepping motor M and a first stopper 34 that restricts the movable range of the gap lever 20, in a condition wherein the gap lever 20 comes up against the first stopper 34 so that the movement of the gap lever 20 is stopped, the stop position of the rotor relative to multiple stator phases which the stepping motor M has is displayed on the LCD 39 as the stepping motor stop phase, the stop phase of the stepping motor M is set to a different setting by the input keys 41 and 42, the stop phase input and set by the operation of the input key 43 is stored in memory in the EEPROM 50 that is able to preserve the memory state of the stop phase irrespective of power interruptions, the stepping motor is driven forward by a predetermined first number of steps, causing the gap lever 20 to come up against the first stopper 34, and the stepping motor is put into an out-of-step condition. After that, the stepping motor M is stopped in the stop phase held in memory in the EEPROM 50. Then the driving of the stepping motor M is begun from that phase which is adjacent to the stop phase toward the direction of reverse turning, turned in reverse by the predetermined second number of steps, and stopped. It is therefore possible, without providing external position detection means, to move the gap lever 20 away from the first stopper 34 and stop it in the standard position.

What is claimed is:

1. A stepping motor drive mechanism for printers comprises:

a multi-phase stepping motor that turns as each phase is excited in turn by drive pulses;

a stepping motor drive circuit that outputs said drive pulses;

a movable member that is driven by the turning of said stepping motor;

a stopper that restricts the movement of said movable member when said stopper comes into contact with said movable member;

drive pulse control means, said drive pulse control means causing said stepping motor to become out of step by causing said stepping motor drive circuit to continue to output drive pulses after said movable member has come into contact with said stopper and thereafter causing said drive pulse control means to stop said output of said drive pulses at a preset fixed phase; and fixed phase switching means responsive to input entered by an operator for switching said preset fixed phase to any of said stepping motor phases.

2. The stepping motor drive mechanism for printers according to claim 1, further comprising a control panel by which an operator enters input to which said fixed phase switching means responds, and a display means for displaying representations of operator entered input.

3. The stepping motor drive mechanism for printers according to claim 1, wherein said stepping motor is a drive source for driving a printer carriage in a direction either approaching toward or receding from a platen of a printer.

4. The stepping motor drive mechanism for printers according to claim 1, wherein switching of said fixed phase is realized by operating keys provided on a control panel.

5. A printer including said stepping motor drive mechanism according to claim 1.

6. A stepping motor drive for printers including a multi-phase stepping motor that turns as each phase is excited in turn by drive pulses, a movable member that is driven by the turning of said stepping motor, and a stopper that restricts the movement of said movable member when said stopper comes into contact with said movable member, said stepping motor drive comprising:

a stepping motor drive circuit that outputs drive pulses;

drive pulse control means, said drive pulse control means causing said stepping motor to become out of step by causing said stepping motor drive circuit to continue to output drive pulses after said movable member has come into contact with said stopper, and thereafter causing said drive pulse control means to stop said output of said drive pulses at a preset fixed phase; and fixed phase switching means responsive to input entered by an operator for switching said preset fixed phase to any of said stepping motor phases.

7. The stepping motor drive for printers according to claim 6, further comprising a control panel by which an operator enters input to which said fixed phase switching means responds, and a display means for displaying representations of operator entered input.

8. The stepping motor drive for printers according to claim 6, wherein said stepping motor is a drive source for driving a printer carriage in a direction either approaching toward or receding from a platen of a printer.

9. The stepping motor drive for printers according to claim 6, wherein switching of said fixed phase is realized by operating keys provided on a control panel.

10. A method of positioning a rotor relative to a stator in a multiple-phase stepping motor that is a drive source for driving a carriage, in a printer, to which is attached a print head in a direction either approaching toward or receding from the platen comprising the steps of:

(a) driving said stepping motor by applying thereto a predetermined first number of drive pulses, causing said stepping motor to be out of step after a movable member attached to said stepping motor has come up against a stopper provided in the printer frame, and provisionally determining any one of stepping-motor excitation phases which said stepping motor takes when it stops;

(b) placing said movable member in a position that is removed from said stopper by any discretionary distance, and then driving said stepping motor, moving said movable member in a direction approaching said stopper and causing it to come up against said stopper, and stopping said stepping motor in the phase provisionally established in step (a) in a condition wherein it is out of step;

(c) driving said stepping motor that has been stopped in step (b) by applying thereto a predetermined second number of drive pulses so that said movable member moves in a direction away from said stopper;

(d) while said stepping motor is turning through a predetermined number of steps as cited in step (c) above, measuring the gap between said print head and platen of said printer;

(e) repeating processes cited in steps (b) through (d) a plurality of times, obtaining a plurality of measured values, comparing said measured values with a standard value for said gap between said print head and said platen, and determining whether or not they contain an error equivalent to one step of said stepping motor;

(f) when no said error is found, setting said phase provisionally established in step (a) without modification, thus establishing the positional relationship between said stopper and said phase, whereas, when said error is found, discarding said phase provisionally established in step (a) provisionally determining another phase, repeating steps in (b) and following, and obtaining a stable rotor stop position which said stepping motor takes when it stops.

11. The method of positioning a rotor relative to a stator in a stepping motor according to claim 10, wherein said measurement of said gap between said print head and said platen in said printer in (d) is performed after removing, from said carriage of said printer, said print head attached to said carriage, and attaching, in place thereof, to said carriage, a dial gauge in the form of a jig.

12. The method of positioning a rotor relative to a stator in a stepping motor according to claim 10, wherein provisionally determining said other phase after discarding the phase provisionally determined previously, in step (f), is done by changing said first number of drive pulses.

* * * * *